US008751787B2

(12) United States Patent
Wang (10) Patent No.: US 8,751,787 B2
(45) Date of Patent: Jun. 10, 2014

(54) METHOD AND DEVICE FOR INTEGRATING MULTIPLE THREAT SECURITY SERVICES

(75) Inventor: Bai Ling Wang, Beijing (CN)

(73) Assignee: International Business Machines Corporation, Armonk, NY (US)

(*) Notice: Subject to any disclaimer, the term of this patent is extended or adjusted under 35 U.S.C. 154(b) by 619 days.

(21) Appl. No.: 12/331,912

(22) Filed: Dec. 10, 2008

(65) Prior Publication Data

US 2009/0158428 A1 Jun. 18, 2009

(30) Foreign Application Priority Data

Dec. 13, 2007 (CN) .......................... 2007 1 0199827

(51) Int. Cl.
*H04L 29/06* (2006.01)
(52) U.S. Cl.
USPC ............ 713/151; 713/150; 713/152; 713/160
(58) Field of Classification Search
USPC ...................... 726/22; 713/150, 151, 152, 160
See application file for complete search history.

(56) References Cited

U.S. PATENT DOCUMENTS

| 7,421,737 | B1* | 9/2008 | Hernacki et al. ............... 726/22 |
| 7,891,001 | B1* | 2/2011 | Greenawalt et al. ............ 726/22 |
| 2003/0061338 | A1* | 3/2003 | Stelliga ......................... 709/224 |
| 2003/0131116 | A1 | 7/2003 | Jain et al. |
| 2004/0088425 | A1 | 5/2004 | Rubinstein et al. |
| 2005/0071420 | A1 | 3/2005 | Trossman et al. |
| 2006/0123481 | A1* | 6/2006 | Bhatnagar et al. ............. 726/24 |
| 2006/0206936 | A1* | 9/2006 | Liang et al. .................... 726/22 |
| 2007/0234414 | A1* | 10/2007 | Liu ................................. 726/11 |
| 2009/0003317 | A1* | 1/2009 | Kasralikar et al. ............ 370/352 |
| 2009/0067328 | A1* | 3/2009 | Morris et al. ............... 370/230.1 |

FOREIGN PATENT DOCUMENTS

| WO | 2004038594 A1 | 5/2004 |
| WO | 2007014507 A1 | 2/2007 |

OTHER PUBLICATIONS

Mitchell, Dave. 'Check Point UTM-1 450'. PC PRO, Jul. 2007, Issue 153 [online] [retrieved on May 13, 2009]. Retrieved from the Internet <URL: http://www.pcpro.co.uk/reviews/113219/check-point-utm-1-450.html?searchString=check+point+utm-1+450>.
Bailey D. et al. 'Versatile appliance guards branches'. IT Week, London, UK: vol. 9, Issue 4, Jan. 30, 2006, p. 27. Retrieved from the Internet <URL: htt;://proquest.umi.com/pqdweb?did=1183590941 &sid=1&Fmt=3&clientId=45714&RQT=309&VName=PQD>.

* cited by examiner

*Primary Examiner* — Mohammad W Reza
(74) *Attorney, Agent, or Firm* — The Steadman Law Firm PLLC; Thomas E. Tyson (57) ABSTRACT

A method and device for integrating multiple threat security services are disclosed. The method may comprise parsing an incoming packet at a current layer and analyzing the packet with respect to multiple threat security services and so that one or more threat security services needed by the packet may be determined. According to an exemplary embodiment, the current layer may be a layer in a protocol stack constructed based on the multiple threat security services. With this method, integrated multiple threat security services may filter application data and parse network packet data via a single integrated entity, and thus the efficacy of filtering application data may be improved while computation overhead may be reduced.

16 Claims, 9 Drawing Sheets

(prior art)

METHOD AND DEVICE FOR INTEGRATING MULTIPLE THREAT SECURITY SERVICES

RELATED APPLICATION

This application claims priority under 35 U.S.C. §119 to Chinese Patent Application No. 200710199827.X filed Dec. 13, 2007, the entire text of which is specifically incorporated by reference herein.

FIELD OF THE INVENTION

The various embodiments described herein generally relate to network threat security services and, more particularly, to a method and device for integrating multiple threat security services.

BACKGROUND OF THE INVENTION

Figure 1:
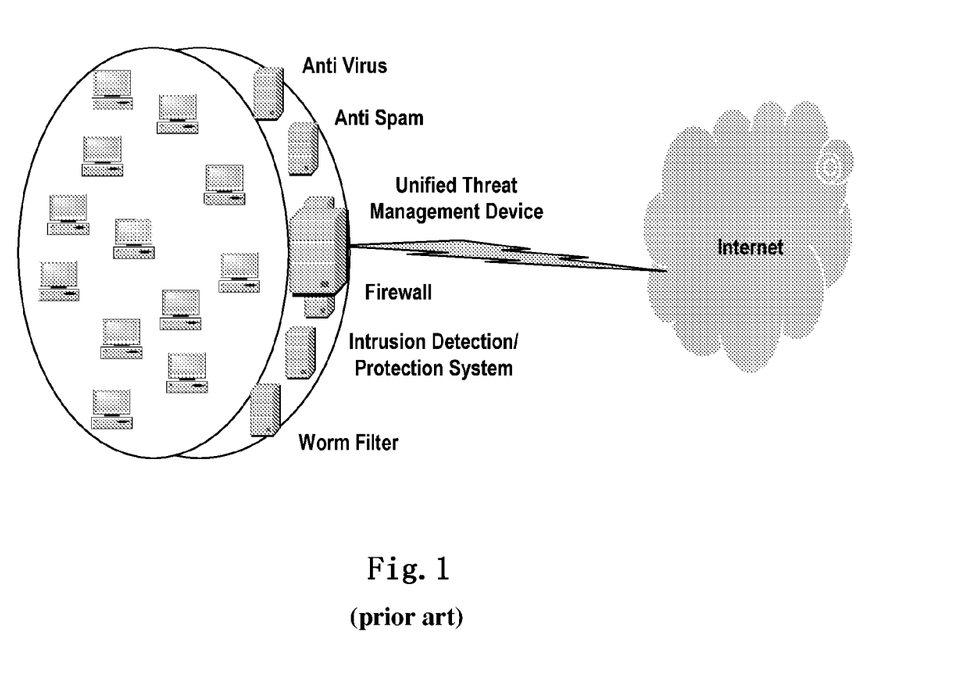
FIG. 1 provides an arrangement of multiple threat security services in a network, according to the prior art.

With the growing application of communication networks, individuals attach increasing importance to security and prevention of threats within communication networks. To this end, a range of security services can be activated on a gateway, such as Intrusion Detection/Protection System (IPS), anti virus, anti spam, content filter (CF) (i.e., firewall), and worm filter (WF), as shown in FIG. 1 according to the prior art. However, a single threat security service in a single device is not an effective solution because of the uncontrolled expenses of on-site administration and troubleshooting. Many platforms offer a multitude of security services in one Unified Threat Management (UTM) device, which is a combination of the above security services with a firewall and which is used by enterprises and service providers to increase their security while reducing total operating costs.

Figure 2:
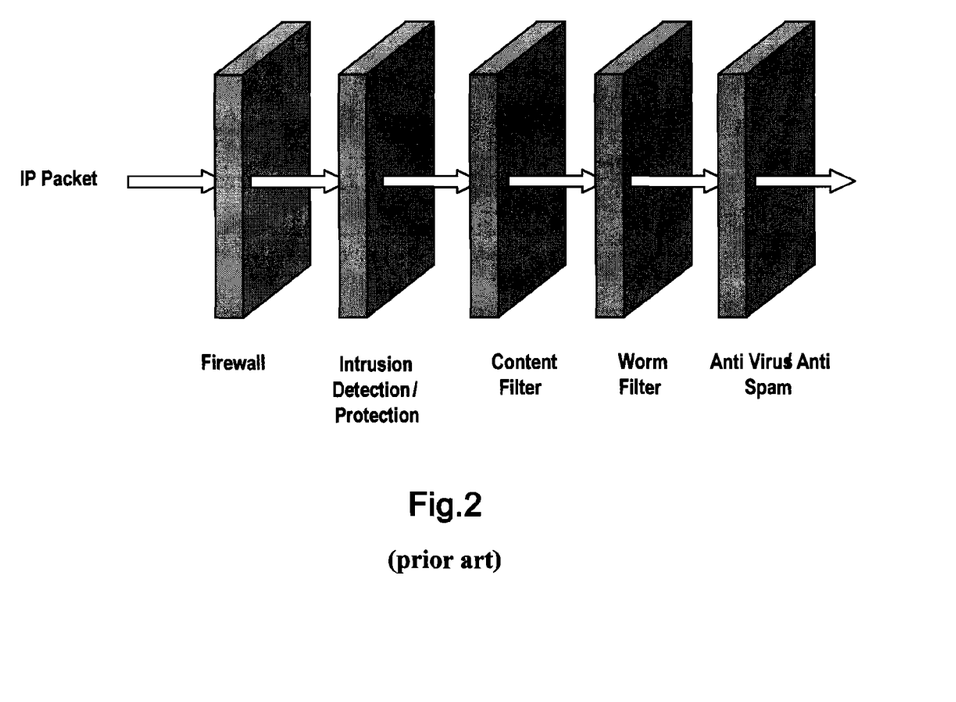
FIG. 2 provides a procedure of processing multiple threat security services, according to the prior art.

A common characteristic among the aforementioned security threat security services is that they all need to scan the entire packet data to obtain corresponding application data. That is to say, each threat security service has its own protocol stack, and each always parses the packet data to obtain corresponding application data. Illustration will be provided in the context of an example according to the prior art, as shown in FIG. 2. When an IP packet enters a gateway, it first enters a firewall threat security service, which performs parsing to determine whether to apply a corresponding threat security service to the packet. If the firewall threat security service does not need to be provided, then the packet enters an Intrusion Detection/Protection threat security service, at which parsing processing is again performed on the packet in order to obtain application data required by the Intrusion Detection/Protection threat security service so that it may be determined whether the Intrusion Detection/Protection threat security service should be applied to this incoming packet. Similar steps are performed until for the rest of the preset multiple threat security services (e.g., the Content Filter, Worm Filter, and Anti Virus Anti Spam threat security services as shown in FIG. 2). Along with an increasing number of integrated threat security services and growth of computation complicacy, protocol parsing has been one of the most computation-intensive operations. This situation is a significant obstacle against UTM's popularity.

In view of this situation, current mechanisms focus on hardware acceleration to improve UTM performance, such as Fortinet's FortiGate, which is an ASIC-accelerated multi-threat security system. However, only some security services can be integrated into Fortinet's UTM device.

Therefore, there is currently a need for a more complete solution for integrating multiple threat security services that can reduce computation overhead.

SUMMARY OF THE INVENTION

In order to overcome the deficiencies in the prior art, the various embodiments described herein provide a method for integrating multiple threat security services that can filter incoming data packets with respect to multiple threat security services.

According to one aspect of the various embodiments, a method is provided for integrating multiple threat security services. The method may parse an incoming packet at a current layer and may analyze the packet with respect to multiple threat security services so that one or more threat security services needed by the packet may be determined.

According to another aspect of the various embodiments, a device is provided for integrating multiple threat security services. The device may comprise a plurality of parsers, wherein each parser of the plurality of parsers is configured for parsing an incoming packet at a current layer. Moreover, the device may comprise an analyzer configured for analyzing the packet with respect to the multiple threat security services so that one or more threat security services needed by the packet may be determined.

According to the method and device of an exemplary embodiment, integrated multiple threat security services may filter application data and parse network packet data via a single integrated entity. Specifically, the method and device may involve a protocol stack constructed based on multiple threat security services. Accordingly, the efficiency of filtering application data may be improved, and computation overhead may be reduced.

BRIEF DESCRIPTION OF THE DRAWINGS

Additional objects and effects of the various embodiments will become more apparent from the following detailed description. The detailed description is to be taken in conjunction with the accompanying drawings, wherein.

DETAILED DESCRIPTION

Description will be provided below with respect to various exemplary embodiments with reference to the accompanying drawings.

Figure 3:
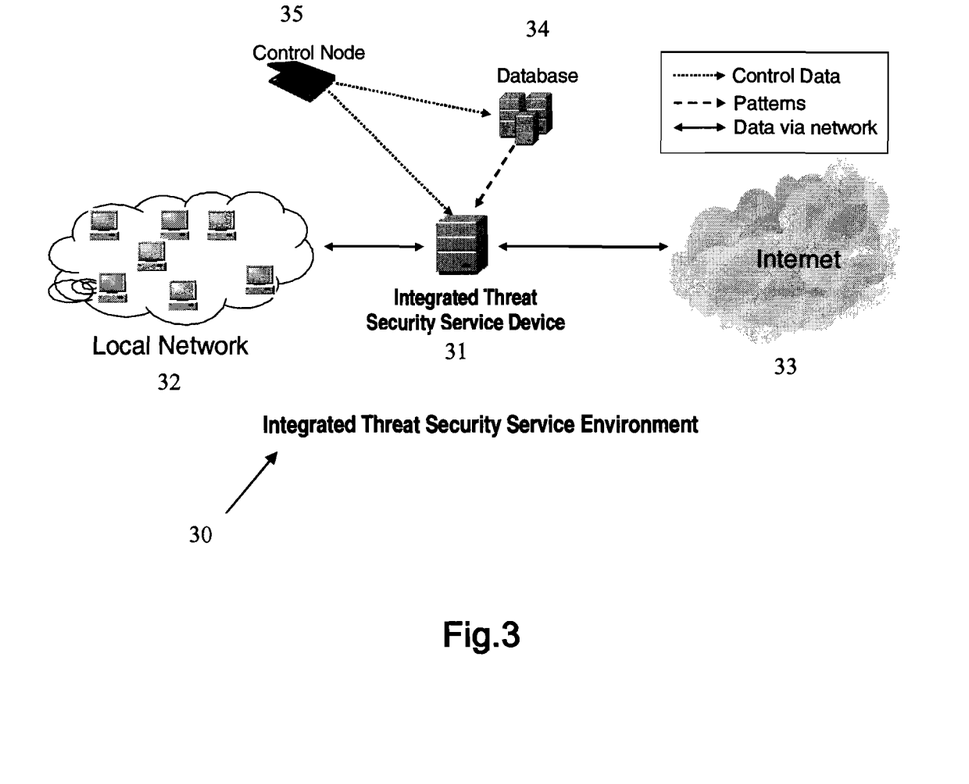
FIG. 3 provides a schematic view of a typical network security service environment in which an exemplary embodiment may be implemented.

FIG. 3 provides a typical network security service environment 30 in which an exemplary embodiment may be implemented. In the environment 30, an integrated threat security service device 31 on which multiple threat security services may be integrated may be connected on a link between a local area network 32 and the Internet 33 in a serial pattern or in a routing pattern. That is to say, all incoming/outgoing local area network data (e.g., SMTP, POP3, HTTP, etc.) may pass through the device 31.

If the device 31 is connected between networks in a serial pattern, it may connect the two networks at the data link layer and may forward data frames according to a network card physical address. A network bridge including the device 31 may form a transparent pathway between the local area network 32 and the Internet 33 and may enable the device 31 to monitor and filter the communication between a client and a server without changing the network configuration or informing the client.

If the device 31 is connected among networks in a routing pattern, then it may be regarded as a node in the network configuration and may be passed through by appropriately configuring a route. Data messages passing through the device 31 may be monitored and filtered.

The device 31 needs to secure the pathways to the Internet 33. In the event of a system failure, the device 31 may support the connection between the local area network 32 and the Internet 33, thereby guaranteeing the network service. The device 31 may be interconnected with a database 34 and a control node 35 via a network (can be via a link or by multiplexing).

The database 34 may have multiple functions. One function may be to store information of a system on which multiple threat security services are integrated, such as configuration and matching patterns, in order to provide the information to be used by the device 31 during initialization and running. Another function may be to store illegal behavior patterns found by the device 31 during operation thereof. The control node 35 may add keywords to the database 34, may control integration information of the integrated multiple threat security services, and/or may view detection results.

Figure 4:
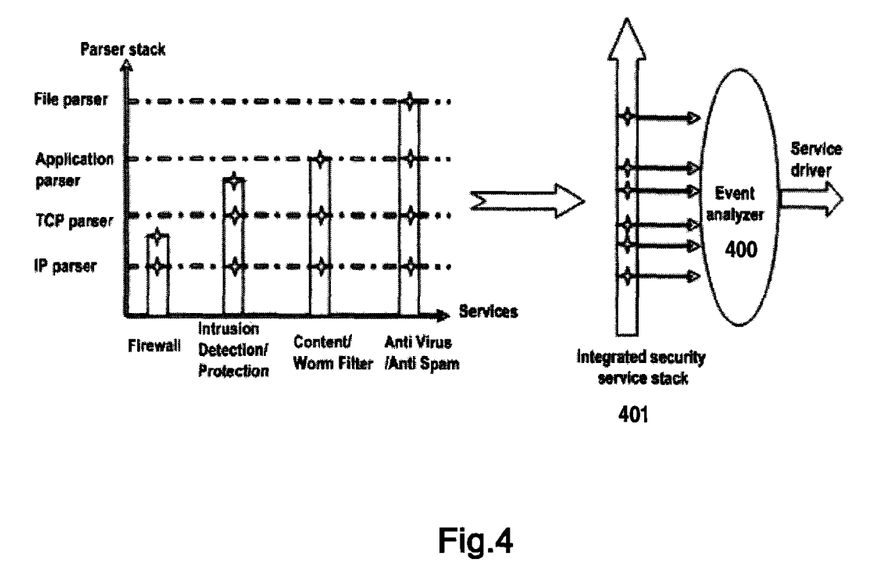
FIG. 4 is a simplified schematic view illustrating the principles of an exemplary embodiment.

FIG. 4 is a simplified schematic view illustrating the principles of an exemplary embodiment. In the left portion of FIG. 4, multiple threat security services in the form of a histogram are shown in conjunction with a protocol hierarchical structure and various corresponding parsers (described in further detail herein), each shown by a dotted line. For example, as indicated by the histogram, the firewall security service may use an Internet Protocol (IPI parser, and the content/worm filter security service may use an IP parser, a Transmission Control Protocol (TCPI parser, or an application layer protocol parser. The right portion of FIG. 4 shows an integrated security service stack 401 according to an exemplary embodiment. Each parser in the integrated security service stack 401 may send parsed packet data to an event analyzer 400 after the completion of corresponding parsing, and the event analyzer 400 may process the data with respect to multiple threat security services, thereby determining the one or more threat security services to be executed.

Figure 5:
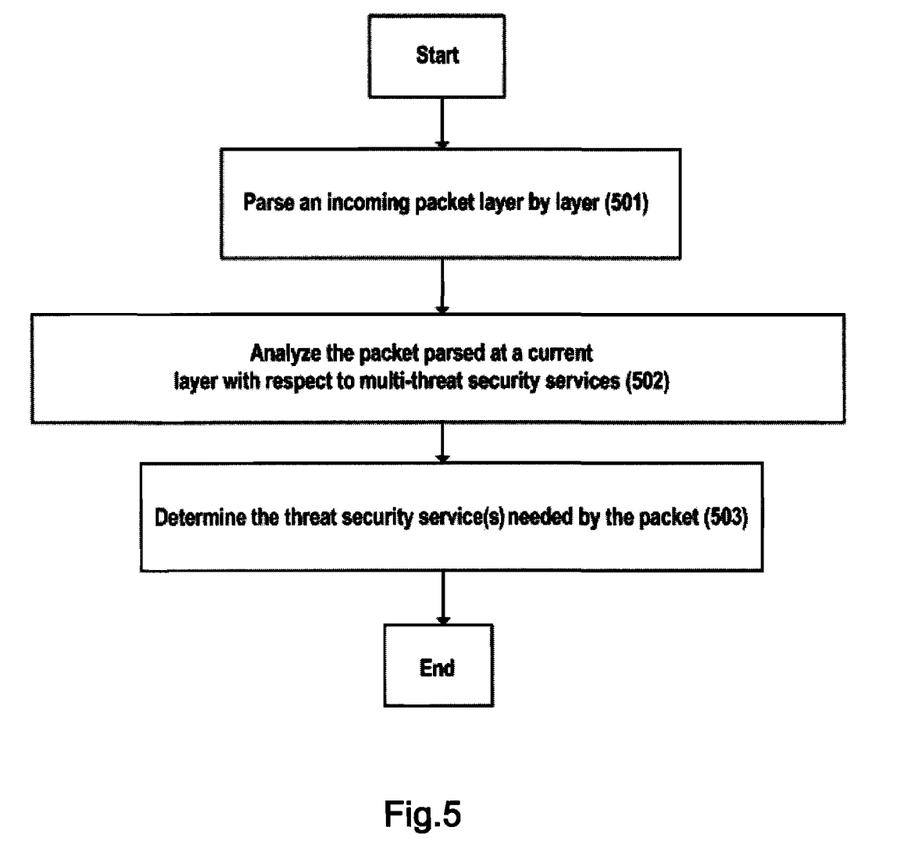
FIG. 5 provides a flowchart showing an operation of integrating multiple threat security services, according to an exemplary embodiment.

FIG. 5 is a flowchart showing the operation of integrating multiple threat security services according to an exemplary embodiment. In step 501, a packet entering a network may be parsed at each layer in accordance with the hierarchical structure of the integrated security service stack 401. In step 502, the packet being parsed at a current layer may be analyzed with respect to multiple threat security services. In step 503, the one or more threat security services required by the packet may be determined via matching algorithms. With reference to FIGS. 6-9, a detailed description will be provided for the steps shown in FIG. 5.

Figure 6:
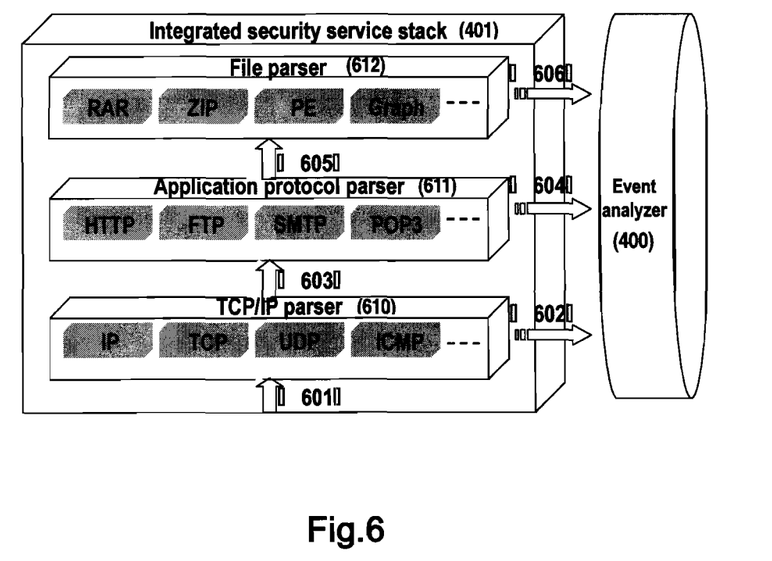
FIG. 6 provides an architectural view of an integrated security service stack, according to an exemplary embodiment.

FIG. 6 provides an architecture view of the integrated security service stack according to an exemplary embodiment. In FIG. 6, parsers are distributed according to the layers in the histogram of FIG. 4. The parsers illustrated in FIG. 6 include a TCP/IP parser 610, an application layer protocol parser 611, and a file parser 612. As shown in FIG. 6, after receiving a data message, the device 31 first may send the data message to the TCP/IP parser 610. In step 601, the TCP/IP parser 610 may restore data packets entering the transport layer by invoking corresponding plug-ins based on different classifications of protocols. For example, upon capturing a TCP message, the TCP/IP parser 610 first may establish information on a connection and may submit the established information on the connection to the corresponding TCP protocol processing plug-in. Then, in step 602 the corresponding TCP protocol processing plug-in may send the restored information (e.g., an IP source address, source port number, destination address, destination port number, message length, etc.) to the event analyzer 400 for further analysis and filtering (a detailed description will be provided herein regarding the operation of the event analyzer 400).

In step 603, the TCP/IP parser 610 may send generated packets from the transport layer to the appropriate application layer protocol parser 611 (e.g., HTTP protocol parser, SMTP protocol parser, POP3 protocol parser, FTP protocol parser, or Telnet protocol parser). This step may entail identifying the appropriate application layer protocol type. A general method of identifying a protocol type is to determine the type of a protocol using the protocol default port specified by the Request for Comments (RFC). However, the accuracy of such method is not high. At present, while a few protocols (e.g., the DNS and SMTP protocols) can make a determination based on the destination port of a TCP connection, all protocols can change a connected port. For example, while the HTTP protocol uses the port 80 in a default situation under the RFC, a large amount of HTTP services use other ports, such as 1080, 8080, etc., in practical applications. In addition to or in lieu of using a protocol default port specified by the RFC, the protocol type may be identified intelligently by intensifying analysis of the content of a data message.

After invoking a corresponding application layer protocol analysis plug-in, in step 604 the application layer protocol parser 611 may restore the uploaded content and may send the restored information to the event analyzer 400 for analysis and filtering.

If a file from the application data stream (e.g., a mail attachment) needs to be reverted, the application layer protocol parser 611 may send the data to the file parser 612 in step 605. In step 606, the file parser 612 may parse the received file, may restore the data, and may send it to the event analyzer 400 for filtering.

It should be noted that the parsers of the various embodiments described herein are not limited to the described TCP/IP parser 610, application layer protocol parser 611, and file parser 612. Accordingly, other types of parsers may be constructed for hierarchical structures of various security service protocol stacks without departing from the spirit and scope of the disclosure.

Figure 7:
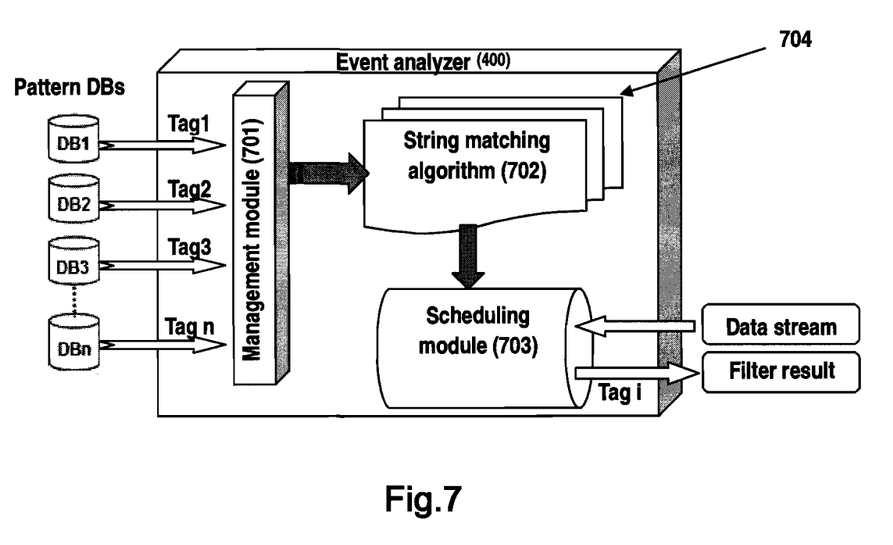
FIG. 7 is a schematic view illustrating an operation performed by an event analyzer, according to an exemplary embodiment.

Referring to FIG. 7, a detailed description will be provided regarding the operation procedure of the event analyzer 400 according to an exemplary embodiment. FIG. 7 provides the event analyzer 400 and pattern databases (i.e., pattern DBs) DB1 through DBn. Pattern database DB1 may be a virus pattern database, pattern database DB2 may be an IPS pattern database, pattern database DB3 may be a WF pattern database, and pattern database DBn may be a CF pattern database. The event analyzer 400 may comprise a management module 701, a string matching algorithm pool 704 comprising string matching algorithms 702, and a scheduling module 703. The pattern databases DB1 through DBn may store patterns corresponding to all threat security services. The pattern database of each threat security service may comprise patterns for the various layers in the integrated security service stack 401. The management module 701 of the event analyzer 400 may be responsible for initializing all of the string matching algorithms 702, which comprise the core of the event analyzer 400.

The event analyzer 400 may carry out a matching procedure that may be divided primarily into three phases: a pattern input phase, a compiling phase, and a string matching phase. In the first phase (pattern input phase), the management module 701 may extract patterns from the pattern databases DB1 through DBn and may arrange them into a pattern set. The patterns may be tagged so that the threat security service corresponding to each pattern may be identified. For example, tag 1 may be assigned to patterns from the pattern database DB1, tag 2 may be assigned to patterns from the pattern database DB2, and so forth. Such tagging will be further described herein with reference to FIG. 8. The second phase (compiling phase) may be executed after all patterns have been prepared; in this phase, string matching algorithms 702 may be compiled using the patterns. Different compiling methods may be used based on different matching algorithms. This phase may be fulfilled by the management module 701, as is further described herein with reference to FIG. 8. The third phase (string matching phase) may occur when the system service is running. After data from a parser in the integrated security service stack 401 (i.e., the TCP/IP parser 610, the application layer protocol parser 611, or the file parser 612 as described herein and shown in FIG. 6) is sent to the event analyzer 400, the scheduling module 703 may select a corresponding string matching algorithm 702 based on the type of inputted data (i.e., based on the stack layer at which the data is sent).

Figure 8:
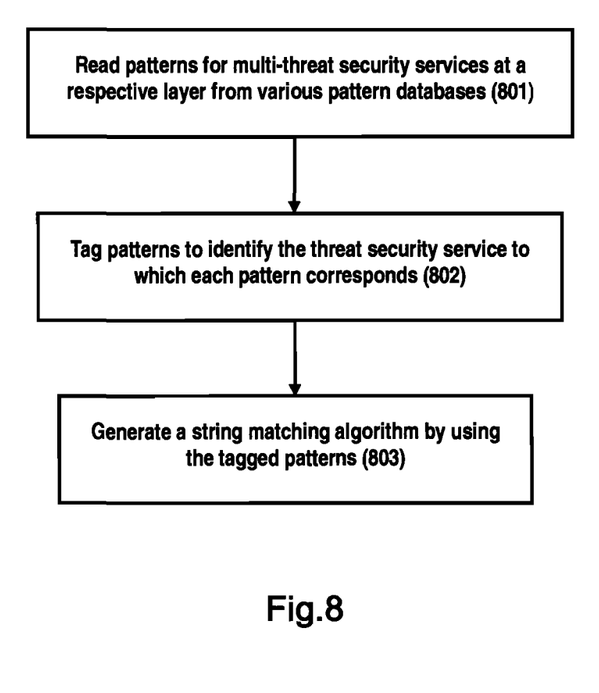
FIG. 8 provides a flowchart of an operating procedure of an event analyzer management module, according to an exemplary embodiment.

FIG. 8 provides a flowchart of the operating procedure of the management module 701 of the event analyzer 400 according to an exemplary embodiment. First, in step 801 the management module 701 may read patterns for multiple threat security services at a respective layer from various pattern databases. For example, the management module 701 may read patterns from pattern databases DB1 through DBn for all security services at the TCP/IP layer (e.g., pattern 1.1.1.1, pattern 10.10.10.10:80, etc.). Next, in step 802 the multiple security service patterns as read may be tagged in order to identify the threat security service that corresponds to each pattern. As shown in FIG. 7, tag 1 may be assigned to each of multiple patterns from the virus pattern database DB1, tag 2 may be assigned to each of multiple patterns from the IPS pattern database DB2, tag 3 may be assigned to each of multiple patterns from the WF pattern database DB3, and tag n may be assigned to each of multiple patterns from the CF pattern database DBn. Subsequently, in step 803 the management module 701 may generate (i.e., compile) a string matching algorithm 702 for the respective layer by using the tagged patterns, wherein all patterns focusing on the layer in the integrated security service stack 401 may be merged into a pattern set used for initializing such string matching algorithm 702. This procedure may be followed for multiple threat security services at all layers in the integrated security service stack 401.

According to an exemplary embodiment, a TCP/IP string matching algorithm, an application layer string matching algorithm, and the like may be generated via the operation procedure of the management module 701. The string matching algorithms 702 for the various layers may be placed into the string matching algorithm pool 704, as indicated by the grouping of spring matching algorithms 702 in FIG. 7. According to existing patterns, one or more state machines may be generated so that a lookup for a certain section of inputted text can be performed via such state machines. Such procedure is named "string search". Highly efficient string matching algorithms 702 may improve the performance of a program.

A brief illustration will be provided of a string matching algorithm 702 that may be employed according to an exemplary embodiment. Such string matching algorithm 702 may be used for determining whether a text such as Text=$t_1 \ldots t_n$ contains a method for one or more character strings P=$p_1 \ldots p_m$. For example, the principle of a finite state machine algorithm is that each of all possible inputs for a matching character string has a state value in each step, and if this state value is equal to the length of the matching character string, a successful match is proven.

According to an implementation manner, matching algorithms may be divided into software pattern matching, TCAM pattern matching, and ASCI pattern matching. Among string matching algorithms, an algorithm matching one character string is called a single-pattern matching algorithm, and an algorithm for simultaneously matching multiple character strings is called a multi-pattern matching algorithm. TCAM pattern matching involves a dedicated chip used for table lookup operations and is characterized by scoring a hit only once (i.e., an inspection is made all at one time). Moreover, the lookup speed is irrelevant to the size of a table. TCAM pattern matching requires the location of a matching character string to be relatively fixed. ASCI pattern matching requires a character string that is to be detected to be first complied with a regular expression and then loaded to a chip. Afterwards, matching is performed. It should be noted that the string matching algorithms described herein are merely illustrative. Accordingly, any suitable string matching algorithm may be selected to implement the various embodiments by those skilled in the art without departing from the spirit and scope of the disclosure.

Figure 9:
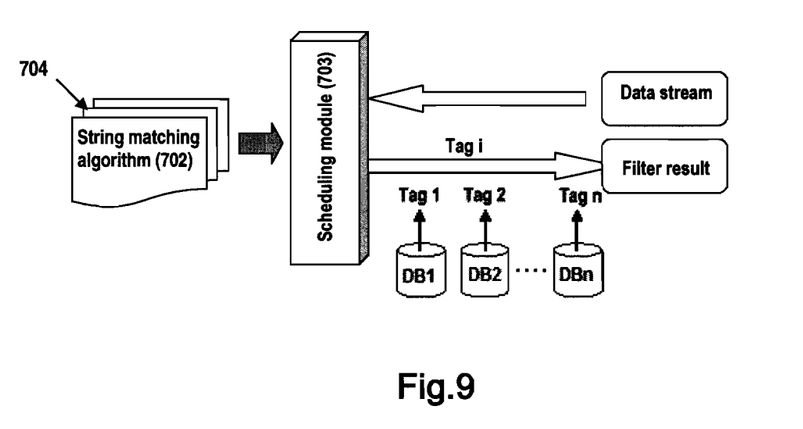
FIG. 9 provides an illustration of an operating procedure of an event analyzer scheduling module, according to an exemplary embodiment.

FIG. 9 shows the operating procedure of the scheduling module 703 of the event analyzer 400 according to an exemplary embodiment. After data from a parser in the integrated security service stack 401 is sent to the event analyzer 400, the scheduling module 703 may select a corresponding string matching algorithm 702 from the string matching algorithm pool 704 to filter (i.e., match) the data and then may return one or more results with tag i (with i being one of tag 1, tag 2 ... tag n). Due to the tag i, a receiver of the filtering result (not shown) may know to which one of multiple pattern databases the pattern identified by tag i belongs, and accordingly the receiver may determine threat security services corresponding to the incoming packet based on such knowledge. The threat security services may detect whether the packet contains one or more threats and may perform appropriate response processing such as alarming, blocking, and the like (e.g., via event responders) in order to address any such threats.

For illustrative purposes, a detailed description will be provided of the procedure for integrating multiple threat security services according to an exemplary embodiment in the context of an exemplary incoming message. Assume that the IP address of a user is 1.1.1.1 and that the user accesses the port 80 of a remote Web server 10.10.10.10 through the local port 25467 (i.e., sends a HTTP request). In this case, the content of the first message 'P' sent by the user generally includes a request command and request content, such as "GET http://news.zzz.com/20071205/12345.shtml".

Suppose that there is a pattern 1.1.1.1 assigned with tag 3 at the TCP/IP layer in the WF pattern database DB3 (FIG. 7), there is a pattern 10.10.10.10:80 assigned with tag 2 at the TCP/IP layer in the IPS pattern database DB2 (FIG. 7), and there is a pattern news.zzz.com assigned with tag 2 at the application layer in the IPS pattern database DB2 (FIG. 7). After the parser at each layer in the integrated security service stack 401 sends the parsed content to the event analyzer 400, the event analyzer 400 may perform the following operations.

When the TCP/IP parser 610 sends information (e.g., IP source address 1.1.1.1, source port number 25467, destination address 10.10.10.10, destination port number 80, the length of a message, etc.) to the event analyzer 400, the scheduling module 703 of the event analyzer 400 invokes the string matching algorithm 702 for the TCP/IP layer. As a result, the scheduling module 703 filters the sent information and finds that the information matches the pattern 1.1.1.1 assigned with tag 3 and corresponding to the WF threat security service and that the information also matches the pattern 10.10.10.10:80 assigned with tag 2 and corresponding to the IPS threat security service. Accordingly, the scheduling module 703 may provide tags 3 and 2 indicating corresponding threat security services WF and IPS (respectively) to a receiver, and the receiver may determine from the tags 3 and 2 that the threat security services WF and IPS (respectively) need to be provided. Once provided, if one or both of the WF and IPS threat security services detect that the message contains one or more threats, then one or both may drive one or more corresponding event responders in order to perform appropriate processing such as alarming, blocking, and the like.

Similarly, when the application protocol parser 611 sends the information "GET http://news.zzz.com/20071205/12345.shtml" to the event analyzer 400, the scheduling module 703 invokes the string matching algorithm 702 for the application layer. As a result, the scheduling module 703 filters the sent information and finds that the information matches the pattern news.zzz.com assigned with tag 2 and corresponding to the IPS threat security service. Accordingly, the scheduling module 703 may provide tag 2 indicating corresponding threat security service IPS to a receiver, and the receiver may determine from the tag 2 that the threat security service IPS needs to be provided. Once provided, if the IPS threat security service detects that the message contains one or more threats, then it may drive one or more corresponding event responders in order to perform appropriate processing such as alarming, blocking, and the like.

It should be noted that in order to facilitate easier understanding of the various embodiments described herein, the foregoing description omits various technical details that are well known to those skilled in the art.

The various embodiments have been presented for purposes of illustration and description and are not intended to be exhaustive or limited to the form disclosed. Many modifications and variations will be apparent to those of ordinary skill in the art. Accordingly, the various embodiments have been chosen and described in order to best explain key principles and to enable others of ordinary skill in the art to understand that all modifications and alterations made without departing from the spirit of disclosure fall within the scope as defined in the appended claims.

The invention claimed is:

1. A method for integrating multiple threat security services, said method comprising:
   generating parsed packet data by parsing an incoming packet at each layer of an integrated security service stack;
   analyzing said generated parsed packet data at each layer of the integrated security service stack with respect to one or more patterns, wherein each of said one or more patterns corresponds to one of said multiple threat security services; and
   consequent to analyzing said parsed packet data with respect to said one or more patterns, determining one or more of said multiple threat security services needed by said parsed packet data by forming a matching algorithm for each layer of said integrated security service stack, wherein forming said matching algorithm comprises assigning a tag to each of said one or more patterns, and wherein each tag identifies one of said multiple threat security services.

2. The method according to claim 1, wherein said integrated security service stack is a protocol stack constructed based on said multiple threat security services.

3. The method according to claim 1, wherein each of said one or more patterns corresponds to a layer of said integrated security service stack.

4. The method according to claim 1, wherein forming said matching algorithm for each layer of said integrated security service stack comprises merging all of said one or more patterns corresponding to the layer into a pattern set.

5. The method according to claim 1, wherein said matching algorithm is a string matching algorithm.

6. The method according to claim 1, wherein determining one or more of said multiple threat security services needed by said parsed packet data further comprises:
   for each layer of said integrated security service stack:
   filtering parsed packet data at the layer by invoking a matching algorithm for the layer; and
   returning one or more tagged results identifying one or more of said multiple threat security services.

7. The method according to claim 1, wherein said multiple threat security services include at least one of an anti virus service, an anti spam service, an intrusion detection/protection system, a firewall, or a worm filter.

8. The method according to claim 1, wherein generating parsed packet data comprises parsing said incoming packet via at least one of an Internet Protocol (IP) parser, a Transmission Control Protocol (TCP) parser, an application layer protocol parser, or a file parser.

9. A device for integrating multiple threat security services, said device comprising:
   a plurality of parsers, loaded in a computer, wherein each of said plurality of parsers is configured for generating parsed packet data by parsing an incoming packet at each layer of an integrated security service stack; and
   an analyzer, also loaded in said computer, configured for analyzing said generated parsed packet data at each layer of the integrated security service stack with respect to one or more patterns and determining one or more of said multiple threat security services needed by said parsed packet data by forming a matching algorithm for each layer of said integrated security service stack consequent to analyzing said parsed packet data with respect to said one or more patterns, wherein each of said one or more patterns corresponds to one of said multiple threat security services, wherein forming said matching algorithm comprises assigning a tag to each of said one or more patterns, and wherein each tag identifies one of said multiple threat security services.

10. The device according to claim 9, wherein said integrated security service stack is a protocol stack constructed based on said multiple threat security services.

11. The device according to claim 9, wherein each of said one or more patterns corresponds to a layer of said integrated security service stack.

12. The device according to claim 9, wherein said analyzer is configured for forming a matching algorithm for each layer of said integrated security service stack by merging all of said one or more patterns corresponding to the layer into a pattern set.

13. The device according to claim 9, wherein said matching algorithm is a string matching algorithm.

14. The device according to claim 9, wherein said analyzer is further configured for determining one or more of said multiple threat security services needed by said parsed packet data by:

for each layer of said integrated security service stack:
filtering parsed packet data at the layer by invoking a matching algorithm for the layer; and
returning one or more tagged results identifying one or more of said multiple threat security services.

15. The device according to claim 9, wherein said multiple threat security services include at least one of an anti virus service, an anti spam service, an intrusion detection/protection system, a firewall, or a worm filter.

16. The device according to claim 9, wherein said plurality of filters include at least one of an Internet Protocol (IP) parser, a Transmission Control Protocol (TCP) parser, an application layer protocol parser, or a file parser.

* * * * *